2,904,604

1,2-DIMETHYL-4-ETHYLBENZENE PRODUCTION

Alistair S. Couper, Hammond, Ind., and Norman Stein, Chicago, and James A. Bowman, Park Forest, Ill., assignors to Standard Oil Company, Chicago, Ill., a corporation of Indiana No Drawing. Application January 24, 1955
Serial No. 483,804

5 Claims. (Cl. 260—668)

This invention relates to the preparation of high purity 1,2-dimethyl-4-ethylbenzene.

The polydimethylstyrene resins have a softening point about 20° C. higher than that of polystyrene resins. Further, when the dimethylvinylbenzene is obtained by the dehydrogenation of a mixture of ethylxylenes (dimethylethylbenzene), by-product indanes are produced which cannot be readily separated from the dimethylvinylbenzenes and appear in the resin as an impurity. The indanes have a very marked adverse effect on the softening point of the resin. The indane is formed by the reaction of ortho-positioned methyl and ethyl groups. Two isomers of ethylxylene are of particular interest because they can be dehydrogenated without the formation of indanes; these isomers are 1,2-dimethyl-4-ethylbenzene and 1,3-dimethyl-5-ethylbenzene. The 1,2-dimethyl-4-ethylbenzene is of particular interest to the synthetic resin industry because the softening point of the polydimethylstyrene derived from it is higher than that of the resin derived from the symmetrical isomer.

An object of the invention is the preparation of 1,2-dimethyl-4-ethylbenzene. A particular object is the preparation of 1,2-dimethyl-4-ethylbenzene of high purity, i.e., a product containing 98% or more of the particular isomer. Other objects will become apparent in the course of the detailed description.

The process of this invention which produces high purity 1,2-dimethyl-4-ethylbenzene comprises contacting, under substantially anhydrous conditions, a feed consisting essentially of (a) ethylbenzene and (b) a member selected from the class consisting of ortho-xylene and mixtures of ortho-xylene and at least one other isomer of xylene, as the only reactive components of the feed, with liquid HF, in an amount sufficient to form a distinct separate acid phase, and $BF_3$, in an amount of at least 1 mole per mole of ethylbenzene and xylene in said feed, at a temperature between about 40° F. and 100° F., for a maximum time of between about 5 minutes and 45 minutes, the longer times corresponding to the lower temperatures, removing HF and $BF_3$ to recover a mixture of aromatic hydrocarbons and separating high purity 1,2-dimethyl-4-ethylbenzene from said mixture.

The 1,2-dimethyl-4-ethylbenzene results from the interaction of ethylbenzene or diethylbenzene with ortho-xylene. Thus ethylbenzene and ortho-xylene are the essential components of the feed to the HF—$BF_3$ contacting zone. When operating under the defined conditions of temperature and time, ethylbenzene does not interact with either meta-xylene or para-xylene. Therefore, the process may be used to contact not only ortho-xylene itself, but also a mixture of ortho-xylene and at least 1 other isomer of xylene, i.e., mixtures of ortho and meta or ortho and para, or ortho, meta and para. An extremely suitable feed to the process is a natural mixture of ethylbenzene and all the xylene isomers, i.e., $C_8$ aromatic hydrocarbons, which is obtained from the high temperature carbonization of coal, or preferably from the naphtha produced in the catalytic reforming of petroleum naphtha in the presence of hydrogen. For example, ultraformate, hydroformate, or platformate, such as is produced from the well-known ultraforming, hydroforming and platforming processes.

In order to obtain the desired high purity 1,2-dimethyl-4-ethylbenzene, it is necessary to exclude other aromatic hydrocarbons and olefinic hydrocarbons which would react with the ethylbenzene or xylene to produce materials boiling in the ethylxylene range and therefore difficultly separable from the desired ethylxylene product. Benzene and toluene may be present in the feed without apparent harmful effect on the reaction product. Also, the paraffinic hydrocarbons which boil closely in the xylene boiling range are tolerable. However, the best results with respect to yield and purity are obtained by operating with a feed which is essentially completely soluble in the HF—$BF_3$ treating agent. The HF—$BF_3$—$C_8$ aromatic hydrocarbon acid phase can dissolve large amounts of benzene and toluene and moderate amounts of paraffinic hydrocarbons. Thus it is not necessary to have a completely paraffin-free feed to attain the desired substantially homogeneous phase condition in the reaction zone.

Under the conditions defined herein, ethylbenzene disproportionates extremely rapidly to meta-diethylbenzene. It is believed that the 1,2-dimethyl-4-ethylbenzene product is actually the product of the interaction of the diethylbenzene with ortho-xylene. Therefore, diethylbenzene may be present in the feed or in a continuous process may be recycled to the contacting zone. However, it is preferred to operate with ethylbenzene.

Under the conditions of the process defined hereinafter, the ethylbenzene not only disproportionates to diethylbenzene but also interacts with ortho-xylene to produce the 1,2 - dimethyl - 4 - ethylbenzene. No appreciable amount of interaction with meta and para-xylene occurs under these conditions. Meta-diethylbenzene and 1,2-dimethyl-4-ethylbenzene have sufficiently different boiling points so that these may be separated by fractional distillation. Thus the presence of any amount of ethylbenzene will result in the formation of diethylbenzene and some of the desired ethylxylene. However, since the ethylxylene is the desired product, the process is carried out utilizing at least 1 mole of ortho-xylene per mole of ethylbenzene present, i.e., a mole ratio of ortho-xylene to ethylbenzene of at least 1. Higher yield of the ethylxylene is obtained when the ratio of ortho-xylene to ethylbenzene is greater than 1 and ratios up to 10 or more may be used. It is preferred to operate with a mole ratio of ortho-xylene to ethylbenzene of between about 2 and 5. (It is to be understood that when diethylbenzene is present in the feed the ratio of ortho-xylene to ethylbenzene should be computed on the basis of moles of ethyl groups present in the feed.)

The interaction takes place under substantially anhydrous conditions. The liquid HF utilized in the process must be substantially anhydrous, i.e., contain not more than about 2–3% of water. The commercial grade of anhydrous hydrofluoric acid is suitable for use in the process.

At least sufficient liquid HF must be present in the contacting or interaction zone to exist as a distinct separate acid phase. It is believed that a complex of diethylbenzene and xylene with both HF and $BF_3$ exists in the acid phase, which complex contains 1 mole of HF per mole of complex. Thus sufficient HF must be present to not only participate in the formation of the complex, but also to dissolve the complex after it has been formed. In general, at least about 2 moles of liquid HF are present per mole of ethylbenzene and xylene charged to the contacting zone. More than this amount may be present, for example, as much as 50 moles or more. It is preferred to operate with between about 6 and 15 moles of liquid HF per mole of ethylbenzene and xylene in the feed. The liquid HF—$BF_3$ treating agent utilized in the process herein contains at least 1 mole of $BF_3$ per mole of xylene and ethylbenzene present in the feed. Thus the amount of $BF_3$ is more than enough to complex all of the xylene present in the feed. More than this amount is desirable, particularly when operating with amounts of benzene, toluene and paraffinic hydrocarbons such that a single homogeneous acid phase does not exist in the contacting zone. It is preferred to operate with between about 1.5 and 3 moles of $BF_3$ per mole of xylene and ethylbenzene in the feed. (It is to be understood that even though all or essentially all the liquid materials present in the contacting zone are in the acid phase under essentially homogeneous acid phase operation, nevertheless, a separate $BF_3$ phase may exist in said zone.)

The process is carried out at a temperature between about 40° F. and 100° F. As has been pointed out before, the reactions taking place involve both disproportionation of ethylbenzene to diethylbenzene and interaction to form the 1,2-dimethyl-4-ethylbenzene. It is necessary to maintain the contacting for a time sufficient to permit the production of the 1,2-dimethyl-4-ethylbenzene in at least appreciable amounts and more desirably until essentially complete interaction has taken place. However, in addition to the disproportionation and interaction reactions already described, there may occur these competing reactions: The isomerization of ortho-xylene to meta-xylene and the isomerization of 1,2-dimethyl-4-ethylbenzene to 1,3-dimethyl-5-ethylbenzene. In order to avoid the loss of interactable ortho-xylene, the time of contacting should be so adjusted as a maximum to produce the greatest conversion to 1,2-dimethyl-4-ethylbenzene with a minimum amount of ortho-xylene isomerization. In order to produce a high purity product, i.e., an ethylxylene product containing on the order of 98% or more 1,2-dimethyl-4-ethylbenzene, it is necessary to limit the contacting time to avoid the formation of the 1,3,5-ethylxylene. A still further side reaction may occur when para and/or meta-xylene are present in the feed; at prolonged conditions of contacting, the para and meta-xylene interact with ethylbenzene to produce predominantly the 1,3,5-ethylxylene isomer. A high purity 1,2-dimethyl-4-ethylbenzene product is produced in high yield when the contacting at 100° F. is carried out for a maximum time of about 5 minutes; and the contacting at 40° F. is carried out for a maximum time of about 45 minutes, the longer times of contacting corresponding to the lower temperatures of contacting. At the preferred temperatures of contacting of between about 50° and 70° F., the preferred time of contacting is between about 15 minutes and 30 minutes, the longer times corresponding to the lower temperatures.

Under the above defined conditions of feed, HF—$BF_3$ agent usage, and time and temperature of contacting, there is obtained an acid phase containing HF—$BF_3$ complexed with xylene, diethylbenzene, 1,2-dimethyl-4-ethylbenzene and possibly very small amounts of 1,3,5-ethylxylene and higher boiling polyalkylbenzenes. In addition to these complexed aromatic hydrocarbons, there are present physically dissolved hydrocarbons, unreacted ethylbenzene, product benzene and other hydrocarbons present in the feed. This mixture of aromatic hydrocarbons is recovered by removing the HF—$BF_3$ from the acid phase. The simplest and most convenient method of removing HF and $BF_3$ is to quench the acid phase with water or dilute aqueous caustic solution. Preferably cold water is used.

In commercial operation, the HF and $BF_3$ must be recovered in reusable form. The HF and $BF_3$ may be removed and the hydrocarbons recovered by distillation. It is preferred to carry out the distillative removal of HF and $BF_3$ under conditions of temperature and time such that essentially no side reactions such as isomerization and interaction take place. By the use of low temperature and vacuum, it is possible to remove distillatively HF and $BF_3$ without impairing the purity of the 1,2-dimethyl-4-ethylbenzene product.

The 1,2-dimethyl-4-ethylbenzene is readily separated from the other hydrocarbons by fractional distillation. Or it may be separated from the diethylbenzene by-product by treatment with HF and $BF_3$ utilizing about 1 mole of $BF_3$ per mole of ethylxylene present in the diethylbenzene-ethylxylene mixture. It is necessary to operate under conditions of time and temperature to avoid isomerization of the 1,2-dimethyl-4-ethylbenzene to the 1,3,5-ethylxylene isomer.

The results obtainable with the process of the invention are described by the following working examples. In these examples, an agitated pressure vessel was used as the interaction zone. The feed was introduced into the vessel followed by the liquid HF and $BF_3$. Commercial grade anhydrous hydrofluoric acid was used as the liquid HF and commercial grade boron trifluoride was the source of the $BF_3$. The reactor and its contents were cooled to the desired temperature and the agitation continued for the desired length of time. In the working examples herein, only one liquid phase was present in the reactor. At the end of the contacting time, the contents of the reactor were withdrawn into a vessel containing cold water in order to decompose the complex. The water temperature in the quenching vessel was maintained at below about 80° F. The oil layer was decanted from the aqueous layer and was immediately washed with aqueous caustic solution, water washed to remove caustic and dried to remove water. The yield of oil in each of the examples was about 85 volume percent of the feed charged to the reactor. The oil loss is believed to consist mainly of product benzene with some loss of the $C_8$ aromatic hydrocarbon also.

The mixture of hydrocarbons recovered from the reactor was carefully distilled in a super-fractionation column and the composition of the total product determined by inspection of the distillation curves. In addition to this, in one run the various fractions were analyzed by infrared technique and the product distribution obtained from the infrared analyses.

In run No. 1, the feed consisted of 3 parts by volume of C.P. orthoxylene and 25 parts by volume of C.P. ethylbenzene. In runs 2 and 3, the feed was a concentrate of $C_8$ aromatic hydrocarbons, derived by extractive distillation with phenol from the hydroformate produced in catalytic reforming over cobalt molybdenum in the presence of hydrogen, of a virgin petroleum naptha. This fraction contained about 3 volume percent non-aromatic hydrocarbons and had a sulfur content of about 0.01 weight percent. In addition to the $C_8$ aromatic hydrocarbons, a slight amount of $C_9$ aromatic hydrocarbons were present. The distribution of $C_8$ aromatic hydrocarbons in mole percent was: Ethylbenzene, 12; ortho-xylene, 21; meta-xylene, 48; and para-xylene, 19.

The operating conditions and product distribution are set out in Table I following. No attempt was made to adjust the product distribution obtained by infrared and distillation from the recovered liquid product for the loss of benzene and $C_8$ aromatic hydrocarbons in the water decomplexing operation. Therefore, the product distributions are of value as showing the purity of the diethylbenzene and 1,2-dimethyl-4-ethylbenzene produced.

Table I

| Test No. | I | II | III |
|---|---|---|---|
| Feed | Ethylbenzene o-xylene | C$_8$ Mixture | C$_8$ Mixture |
| HF, moles/mole of feed | 11.2 | 11.2 | 11.2 |
| BF$_3$, moles/mole of feed | 1.9 | 1.9 | 1.0 |
| Temperature, °F | 66 | 50 | 66 |
| Time, minutes | 10 | 15 | 5 |
| Reactor pressure, p.s.i.g. | 220 | 200 | 120 |
| Recovered Product, Distribution (Dist.): | (I.R.) | | |
| Benzene | 9 | 9.5 | 7 | 5 |
| Toluene | 0 | 0 | Tr | Tr |
| Ethylbenzene | 2 | 4.5 | 4 | 7 |
| p-m-xylene | 15 | 14 | 43 | 54 |
| o-xylene | 44 | 43 | 18 | 9 |
| C$_9$ Aromatics | 0 | 0 | 7 | 8 |
| Di-ethylbenzene | 5 | 2.5 | 5 | 2 |
| 1,2-dimethyl-4-ethylbenzene | 21 | 22 | 12 | 11 |
| Heavier | 4 | ------ | 4 | 4 |
| Percent Ethylbenzene interacted to form the 1,2-dimethyl-4-ethylbenzene | | 69 | 38 | 34 |
| 1,2-dimethyl-4-ethrlbenzene content of 185–190° C. fraction, percent | | >98.5 | >98 | >98 |

Within the error of the infrared determination, the diethylbenzene was pure meta-diethylbenzene. Although the ethyl-xylene product is given a purity of 98% or more in Table I, it is believed that within the error of the infrared determination this product was essentially pure 1,2-dimethyl-4-ethylbenzene. The data show that some isomerization of ortho-xylene did occur even under these conditions of contacting time; however, no adverse effect had taken place because at these conditions the para and meta-xylene had not interacted with ethylbenzene.

Thus having described the invention, what is claimed is:

1. A process for the production of high purity 1,2-dimethyl-4-ethylbenzene which comprises contacting, under substantially anhydrous conditions, a feed consisting essentially of (a) ethylbenzene and (b) a member selected from the class consisting of ortho-xylene and mixtures of ortho-xylene and at least one other isomer of xylene, in a mole ratio of o-xylene to ethylbenzene in said feed of at least one as the only reactive components of the feed, with liquid HF, in an amount sufficient to form a distinct separate acid phase and BF$_3$, in an amount of at least 1 mole per mole of ethylbenzene and xylene in said feed, at a temperature between about 40° F. and 70° F., for a maximum time of between about 5 minutes and 45 minutes, the longer maximum times corresponding to the lower temperatures, removing HF and BF$_3$ to recover a mixture of aromatic hydrocarbons containing 1,2-dimethyl-4-ethylbenzene as essentially the only dimethyl ethylbenzene and separating said essentially pure 1,2-dimethyl-4-ethylbenzene from said mixture.

2. The process of claim 1 wherein said liquid HF is present in an amount between about 6 and 15 moles per mole of ethylbenzene and xylene in said feed.

3. The process of claim 1 wherein the BF$_3$ is present in an amount between about 1.5 and 3 moles per mole of ethylbenzene and xylene in said feed.

4. The process of claim 1 wherein said feed is a mixture of C$_8$ aromatic hydrocarbons derived from the naphtha product of petroleum naphtha catalytic reforming in the presence of hydrogen.

5. A process for the production of high purity 1,2-dimethyl-4-ethylbenzene which comprises contacting, under substantially anhydrous conditions, a feed consisting of ethylbenzene and ortho-xylene, in a mole ratio of xylene to ethylbenzene of between about 2 and 5, with liquid HF—BF$_3$ agent, the liquid HF being present in an amount between about 6 and 15 moles per mole of feed and the BF$_3$ being present in an amount between about 1.5 and 3 moles per mole of feed, at a temperature between about 50° F. and 70° F. for a maximum time between about 15 minutes and 30 minutes, the longer maximum times corresponding to the lower temperatures, removing HF and BF$_3$ to recover a mixture of aromatic hydrocarbons containing 1,2-dimethyl-4-ethylbenzene as essentially the only ethylxylene present, and separating high purity 1,2-dimethyl-4-ethylbenzene from said mixture.

References Cited in the file of this patent
UNITED STATES PATENTS

| | | |
|---|---|---|
| 2,425,559 | Passino et al. | Aug. 12, 1947 |
| 2,521,444 | Brooke et al. | Sept. 5, 1950 |
| 2,578,294 | Elwell | Dec. 11, 1951 |
| 2,661,382 | Lien et al. | Dec. 1, 1953 |
| 2,683,760 | McCauley et al. | June 13, 1954 |
| 2,725,413 | McCauley et al. | Nov. 29, 1955 |
| 2,766,305 | McCaulay et al. | Oct. 9, 1956 |